United States Patent [19]
Konosu et al.

[11] Patent Number: 5,810,897
[45] Date of Patent: Sep. 22, 1998

[54] SPRAY TOWER

[75] Inventors: Kazumi Konosu; Koichiro Uno, both of Tokyo, Japan

[73] Assignee: Mitsubishi Materials Corporation, Tokyo, Japan

[21] Appl. No.: 521,730

[22] Filed: Aug. 31, 1995

[30] Foreign Application Priority Data

Jun. 6, 1995 [JP] Japan ..................................... 7-139328

[51] Int. Cl.[6] .................................................. B01D 51/00
[52] U.S. Cl. ................................ 55/418; 55/463; 95/216; 96/303; 96/366
[58] Field of Search ............................. 55/236, 240, 260, 55/391, 397, 418, 441, 449, 463; 95/216, 221, 267; 261/108

[56] References Cited

U.S. PATENT DOCUMENTS

| | | | |
|---|---|---|---|
| 411,602 | 9/1889 | Miesenhelder et al. | 55/391 |
| 1,581,462 | 4/1926 | McSweeney | 55/441 |
| 3,420,040 | 1/1969 | Neely et al. | 55/449 |
| 3,925,045 | 12/1975 | Cheng | 55/397 |
| 5,077,024 | 12/1991 | Janka | 55/260 |

*Primary Examiner*—C. Scott Bushey
*Attorney, Agent, or Firm*—Oblon, Spivak, McClelland, Maier & Neustadt, P.C.

[57] ABSTRACT

A spray tower includes inner and outer tubes arranged coaxial with each other on a common vertical axis. At the lower end of the inner tube is provided a guide cylinder group composed of a plurality of guide cylinders which are arranged coaxially with each other on a common vertical axis. A guide vane is provided under the guide cylinder group. The guide vane is in a shape of inverted truncated cone whose diameter is reduced in a downward direction. Accordingly, gas flowing downward between the inner and outer tubes is uniformly divided under the guide cylinder group by means of the guide vane so that the divided gases flows upward uniformly inside the respective cylinders. A plurality of vertical rectifying plates may be provided to the guide cylinder group so as to extend radially from the vertical axis of the guide cylinder group for reducing pressure loss. Further, a plurality of guide vanes each having a truncated-conical shape may be provided at the lower ends of the respective cylinders for reducing pressure loss.

2 Claims, 7 Drawing Sheets

SPRAY TOWER

BACKGROUND OF THE INVENTION

1. Field of the Invention

The present invention relates to an improvement in a double-tube spray tower for use in dust removal, temperature control, humidity control and others for high-temperature highly-dusty gas or the like.

2. Description of the Background Art

When cleaning dusty gas with high efficiency by electrically collecting dust carried by the gas, it is necessary that electric resistances of dust particles are within a range between $10^5$ Ωcm to $10^{11}$ Ωcm. For this purpose a spray tower is generally provided at the initial stage of an electric precipitator for adjusting temperature and humidity of the dusty gas, for example by increasing the gas temperature by blowing water vapor on the dusty gas or by lowering the gas temperature by spraying the dusty gas with water, so as to optimize the electric resistance of the dust in the dusty gas.

One type of conventional double-tube spray tower is disclosed in Japanese Second (examined) Patent Publication No. 59-30464, which will be explained hereinbelow with reference to FIG. 8.

High-temperature highly-dusty gas introduced into the spray tower via a dusty-gas inlet air pipe 1 flows downward in an annular passage between an inner tube 9 and an outer tube 2 while heating the outer periphery of the inner tube 9. The gas then reaches portions in a dust hopper 3 where the gas changes direction so as to flow upward, and further flows upward within the inner tube 9 so as to be discharged via an outlet air pipe 5.

A concentric guide cylinder group 4 is arranged at the lower end of the inner tube 9. The guide cylinder group 4 is composed of a plurality of short cylinders, each having a diameter smaller than that of the inner tube 9. The cylinders are arranged coaxial with each other in a vertical direction, that is, having a common vertical axis, so that the lower ends of the respective cylinders cooperatively form an inverted-conical shape. Thus, the gas flowing downward between the dust hopper 3 and the guide cylinder group 4 turns around the lower ends of the respective cylinders to change its flow direction upward and is divided in sequence to flow into respective annular passages formed by the guide cylinder group 4, thereby being rectified to flow upward or rise within the inner tube 9.

A liquid spray gun 6 having a spray nozzle 7 are provided at the lower part within the inner tube 9 to humidify the upward flowing gas, and a dust-particle discharging unit 8 is provided at the lower end of the outer tube 2 to collect dust separated from the gas turned around the guide cylinder group.

In the foregoing conventional spray tower, since the guide cylinder group 4 is provided, the gas which turns around the lower end of the inner tube 9 to enter the inner tube 9 is rectified via the guide cylinder group 4. Accordingly, even when the spray nozzle 7 is arranged at the lower part of the inner tube 9, no wetted-wall phenomenon occurs at the lower inner periphery of the inner tube 9. Therefore, adhesion of dust particles, corrosion, discharging trouble due to falling of wet dust particles and the like, which would be otherwise caused by the wetted-wall phenomenon, can be prevented.

On the other hand, in the foregoing conventional spray tower, there have been problems in that the gas flow is disturbed when the gas flows downward between the outer and inner tubes to flow into the guide cylinder group and that the gas also flows in a turning direction within the guide cylinder group, which tends to cause relatively large pressure losses and turbulent flows.

SUMMARY OF THE INVENTION

Therefore, it is an object of the present invention to provide a spray tower which is capable of achieving uniform gas flows or improved rectification at the lower part of an inner tube of the spray tower.

According to a first aspect of the present invention, in a spray tower having an inner tube and an outer tube arranged coaxial with each other on a common vertical axis so as to allow dusty gas to flow downward between the inner and outer tubes and then change its flow direction to flow upward within the inner tube for performing dust removal, temperature control and humidity control, a short concentric guide cylinder group is provided at a lower end of the inner tube, the guide cylinder group having diameters smaller than a diameter of the inner tube and being arranged vertically such that lower ends of the guide cylinder group form a shape of an inverted cone; and a guide vane is provided under the guide cylinder group, the guide vane having a shape of an inverted truncated cone whose diameter is reduced in a downward direction.

According to a second aspect of the present invention, in a spray tower having an inner tube and an outer tube arranged coaxial with each other on a common vertical axis so as to allow dusty gas to flow downward between the inner and outer tubes and then change its flow direction to flow upward within the inner tube for performing dust removal, temperature control and humidity control, a short concentric guide cylinder group is provided at a lower end of the inner tube, the guide cylinder group having diameters smaller than a diameter of the inner tube and arranged vertically such that lower ends of the guide cylinder group form a shape of an inverted cone; and vertical rectifying plates extend radially from a vertical axis of the guide cylinder group for dividing a gas rising passage within the guide cylinder group into a plurality of passages.

According to a third aspect of the present invention, in a spray tower having an inner tube and an outer tube arranged coaxial with each other on a common vertical axis so as to allow dusty gas to flow downward between the inner and outer tubes and then change its flow direction to flow upward within the inner tube for performing dust removal, temperature control and humidity control, a short concentric guide cylinder group is provided at a lower end of the inner tube, the guide cylinder group having diameters smaller than a diameter of the inner tube and arranged vertically such that lower ends of the guide cylinder group form a shape of inverted cone; and guide vanes are provided at lower ends of respective guide cylinders to constitute the guide cylinder group, each of the guide vanes having a shape of a truncated cone whose diameter increases in a downward direction.

In the spray tower according to the first aspect, the guide vane in a shape of inverted truncated cone is provided under the guide cylinder group so that a portion of the gas flowing downward between the inner and outer tubes is divided uniformly over a wide range under the guide cylinder group by means of the guide vane.

In the spray tower according to the second aspect, since radially extending rectifying plates are provided, a part of the gas flow which tends to turn within the guide cylinder group is eliminated so that the gas flows smoothly vertically upward in the guide cylinder group.

In the spray tower according to the third aspect, the guide vanes each having a shape of truncated cone are provided at the lower ends of the respective guide cylinders of the guide cylinder group so that the pressure loss becomes significantly small while the gas turns around the lower ends of the respective guide cylinders of the guide cylinder group.

BRIEF DESCRIPTION OF THE DRAWINGS

The present invention will be understood more fully from the detailed description given hereinbelow, taken in conjunction with the accompanied drawings, in which.

DETAILED DESCRIPTION OF THE PREFERRED EMBODIMENTS

Now, preferred embodiments of the present invention will be described hereinbelow with reference to the accompanying drawings.

Figure 1:
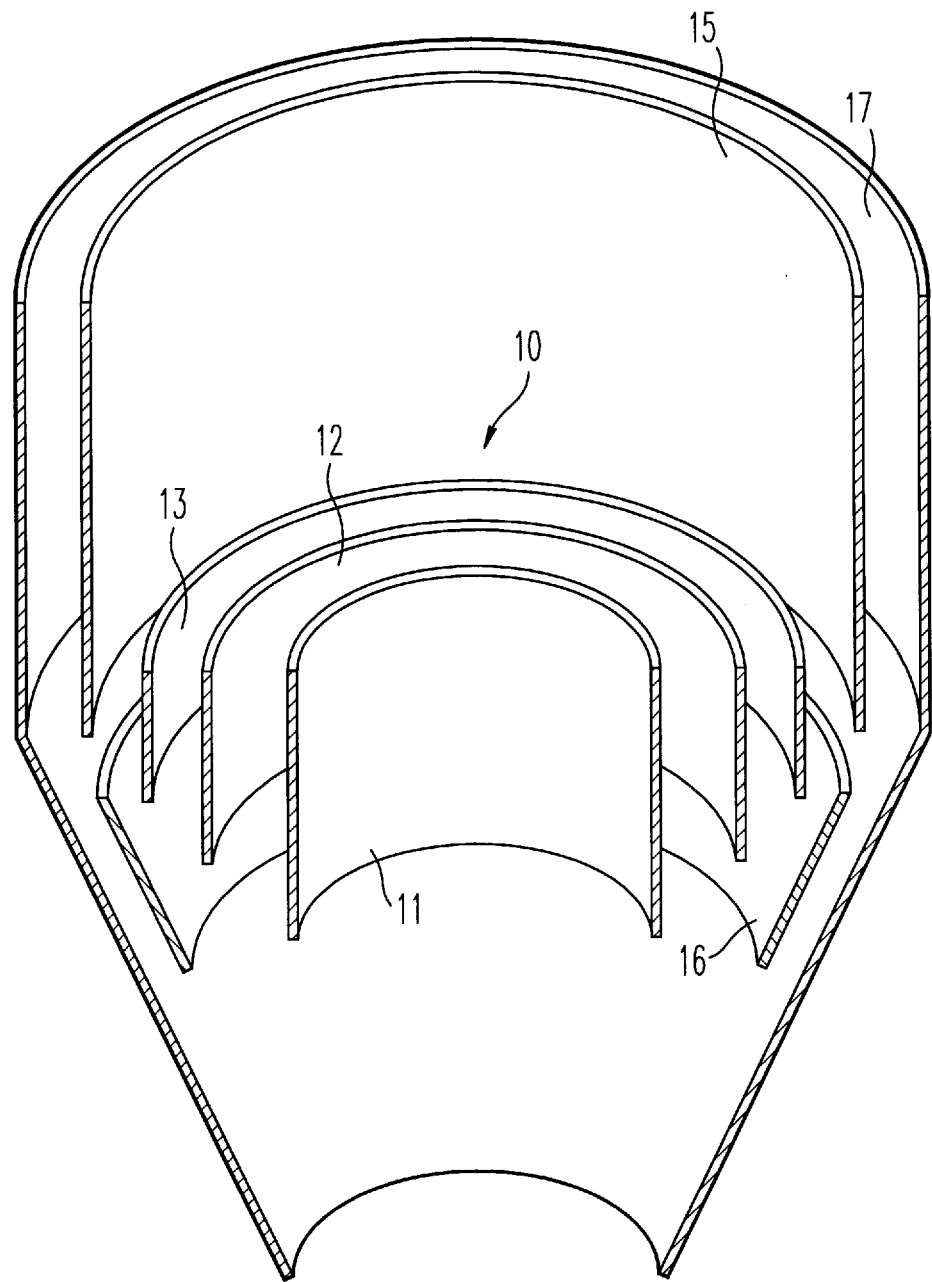
FIG. 1 is a perspective sectional view showing a spray tower according to a first preferred embodiment of the present invention.
Figure 2:
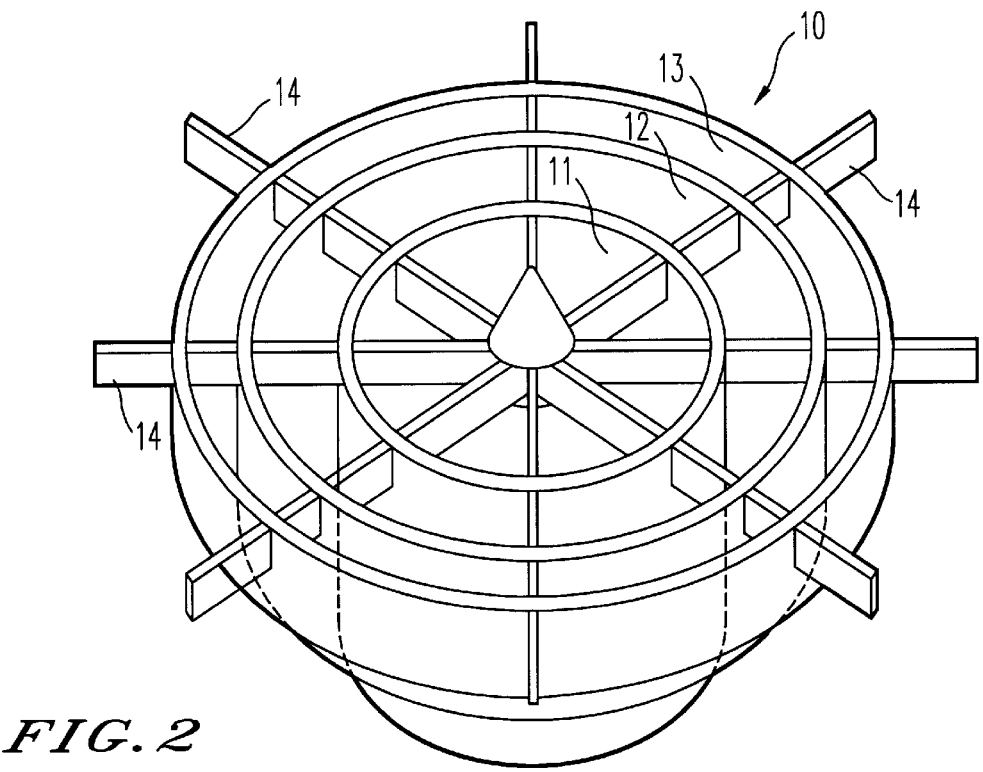
FIG. 2 is a perspective view showing a guide cylinder group according to the first preferred embodiment.
Figure 3:
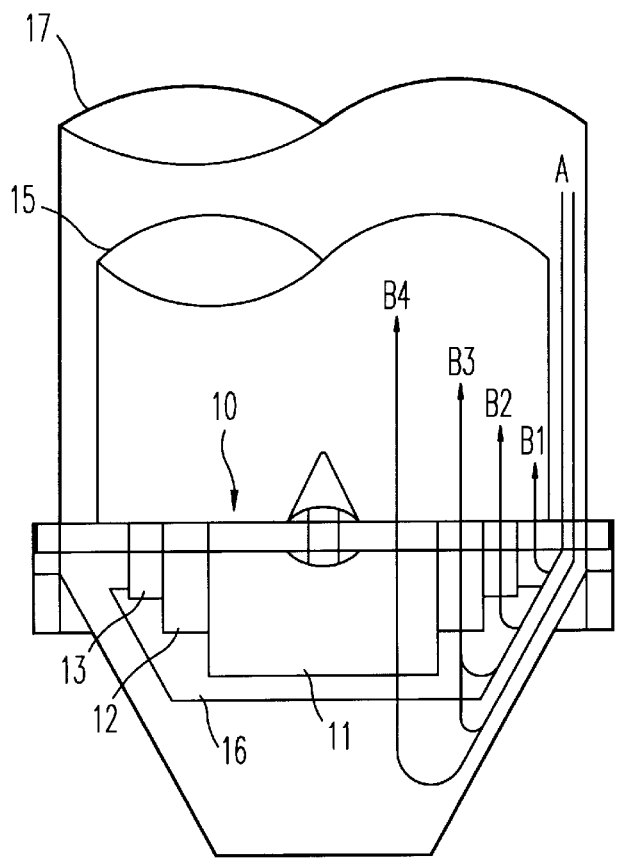
FIG. 3 is an explanatory diagram showing gas flows according to the first preferred embodiment.

FIG. 1 is a perspective sectional view of a spray tower according to a first preferred embodiment of the present invention, FIG. 2 is a perspective view of a guide cylinder group in the first preferred embodiment, and FIG. 3 is an explanatory diagram showing gas flows in the first preferred embodiment.

In this preferred embodiment, the spray tower includes inner and outer tubes 15 and 17 which are arranged coaxial with each other on a common vertical axis. At the lower end of the inner tube 15 is provided a concentric guide cylinder group 10. The guide cylinder group 10 is composed of three guide cylinders 11, 12 and 13 which are arranged coaxial with each other on a common vertical axis. The guide cylinders 11, 12 and 13 are coupled to each other via radially extending beams 14 and further supported to the inner tube 15 via the beams 14.

Under the guide cylinder group 10 is provided a guide vane 16 in the shape of inverted truncated cone whose diameter is reduced in a downward direction. The guide vane 16 is arranged at a position so as to divide the gas flowing downward between the inner tube 15 and the outer tube 17. It is preferable that an inclination of the guide vane 16 is approximately that of a hopper section of the outer tube 17, that is, the guide vane 16 is arranged substantially in parallel with the hopper section of the outer tube 17.

In the spray tower having the foregoing structure, gas A flowing downward between the outer tube 17 and the inner tube 15 is uniformly divided into a wide range of flows under the guide cylinder group 10 by means of the guide vane 16, as shown by arrows B1, B2, B3 and B4 in FIG. 3. Accordingly, the divided gases flows upward substantially uniformly inside the respective cylinders 11, 12 and 13, thereby preventing a large amount of the gas from selectively flowing into the region between the outermost cylinder 13 and the adjacent cylinder 12. As appreciated, since the gas flows uniformly in the respective cylinders 11, 12 and 13, the dust collecting efficiency in the hopper section is improved.

Figure 4:
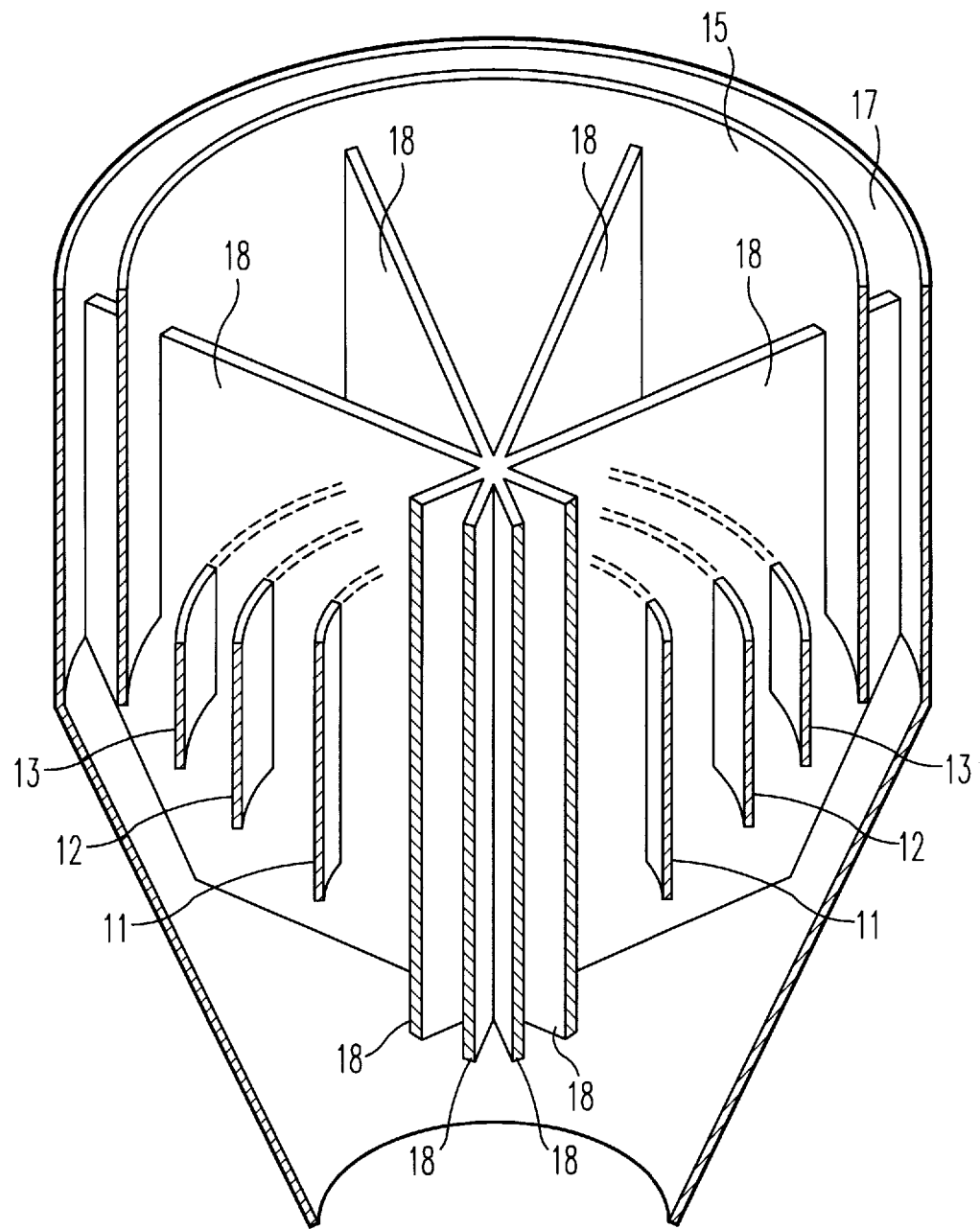
FIG. 4 is a perspective sectional view showing a spray tower according to a second preferred embodiment of the present invention.
Figure 5A:
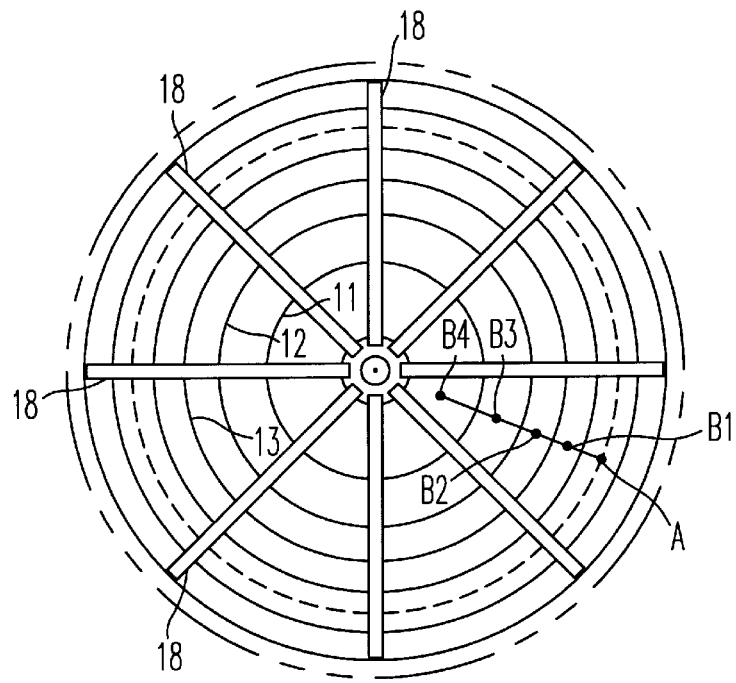
FIG. 5A is a plan view of the spray tower shown in FIG. 4.
Figure 5B:
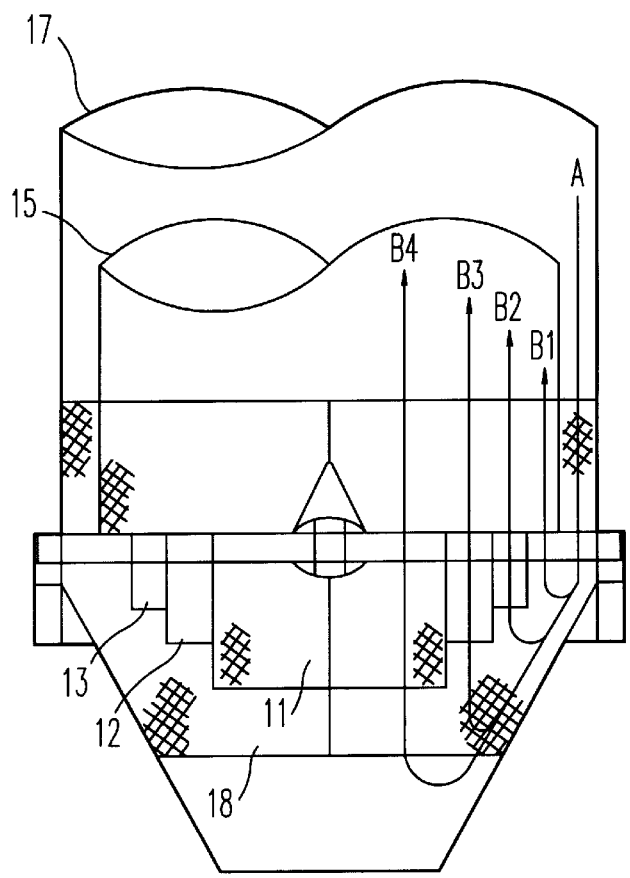
FIG. 5B is an explanatory diagram showing gas flows according to the second preferred embodiment.

FIG. 4 is a perspective sectional view of a spray tower according to a second preferred embodiment of the present invention, FIG. 5A is a plan view of the spray tower shown in FIG. 4, and FIG. 5B is an explanatory diagram showing gas flows in the second preferred embodiment.

In this preferred embodiment, the guide cylinder group composed of the cylinders 11, 12 and 13 is provided with a plurality, such as eight, of vertical rectifying plates 18 extending radially from the vertical axis of the guide cylinder group 10. Each rectifying plate 18 extends into an annular passage formed between the inner and outer tubes 15 and 17. The lower end of each rectifying plate 18 is located at a position corresponding to, or lower than, the lower end of the guide cylinder group 10, while the upper end of each rectifying plate 18 is located at a position higher than the upper end of the guide cylinder group.

By providing the rectifying plates 18, the gas flowing into the guide cylinder group 10 is prevented from flowing in a circumferential turning direction so that the gas is rectified to flow substantially vertically upward along the rectifying plates 18 in the guide cylinder group 10. As appreciated, since the gas is rectified to flow vertically upward only, the pressure loss is significantly diminished.

Figure 6:
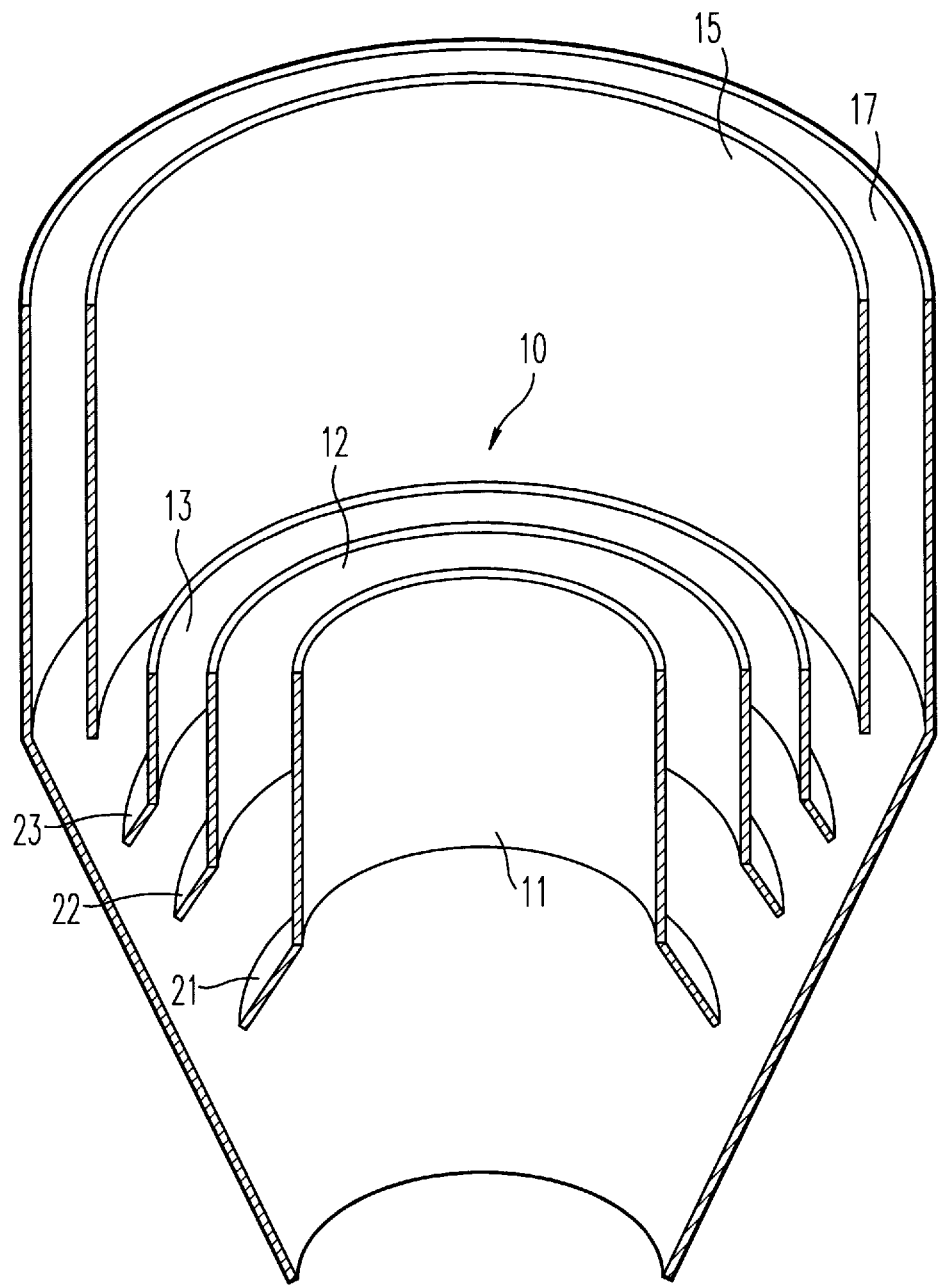
FIG. 6 is a perspective sectional view showing a spray tower according to a third preferred embodiment of the present invention.
Figure 7:
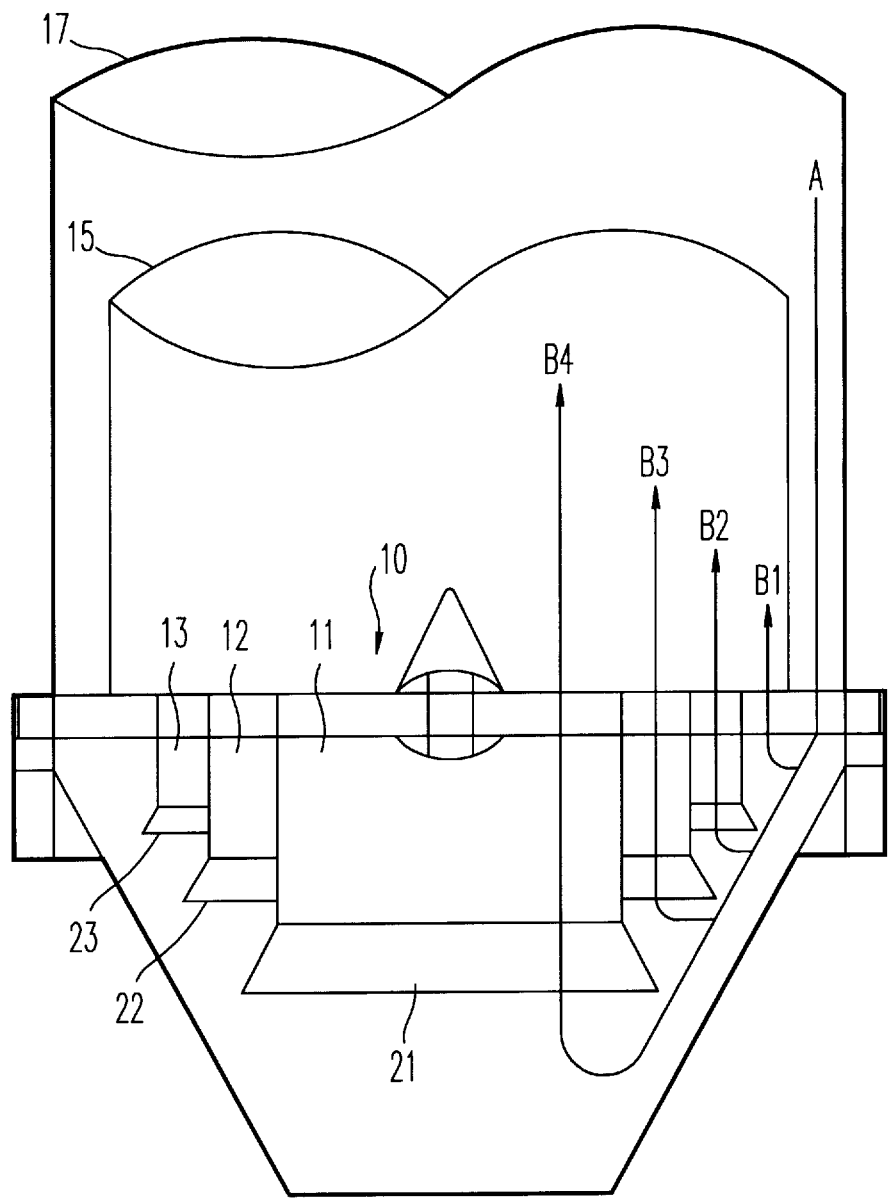
FIG. 7 is an explanatory diagram showing gas flows according to the third preferred embodiment.
Figure 8:
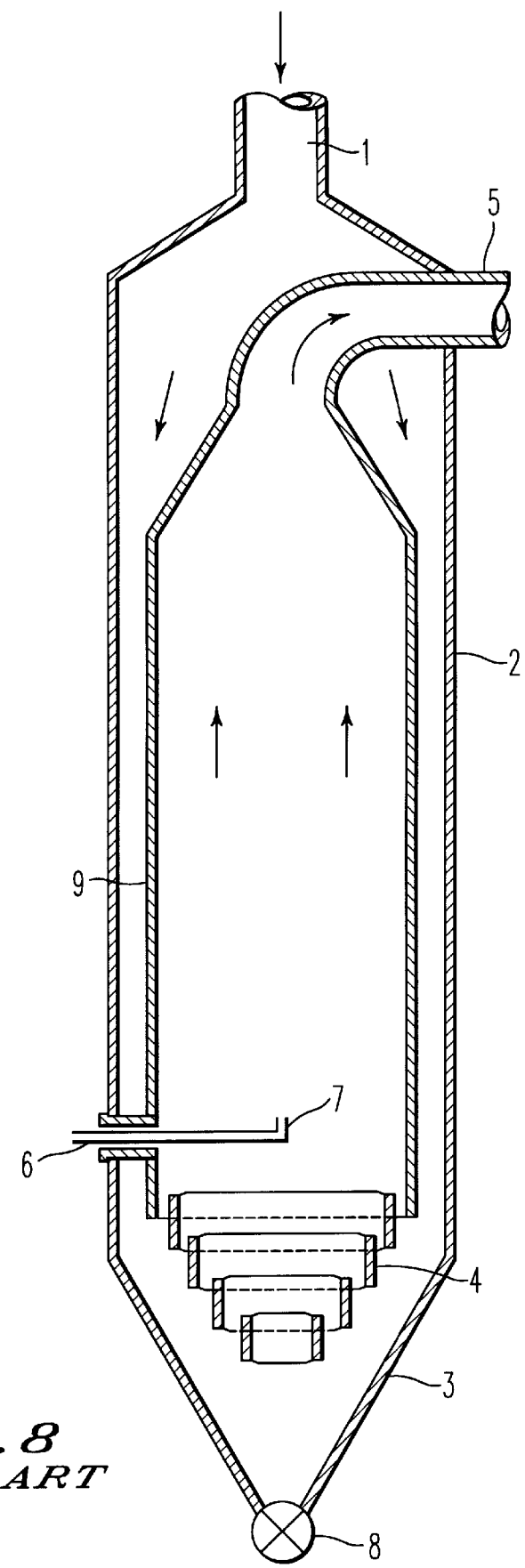
FIG. 8 is a sectional view showing a conventional spray tower.

FIG. 6 is a perspective sectional view of a spray tower according to a third preferred embodiment of the present invention, and FIG. 7 is an explanatory diagram showing gas flows in the third preferred embodiment.

In this preferred embodiment, at the lower ends of the respective cylinders 11, 12 and 13 of the guide cylinder group 10 are provided guide vanes 21, 22 and 23, each of which is in a shape of truncated cone and increases its diameter in a downward direction. An inclination of each of the guide vanes 21, 22 and 23 is set to be 30° to 60° relative to the horizontal plane. It is preferable that each guide vane is provided on flow lines of the gas turning round the lower end of the corresponding cylinder to change its flow direction from downward to upward.

By providing the guide vanes 21, 22 and 23 at the lower ends of the respective cylinders 11, 12 and 13, the flow lines of the gas turning around the lower ends of the cylinders 11, 12 and 13 are not disturbed so that the pressure loss is diminished.

In the spray tower according to the first preferred embodiment, the gas flows uniformly within the respective cylinders constituting the guide cylinder group so that the dust collecting efficiency is improved while the gas turns around the lower ends of the inner tube and the guide cylinder group.

In the spray tower according to the second preferred embodiment, the gas flow in the circumferential turning direction is prevented in the guide cylinder group so that the gas flow is rectified to reduce the pressure loss.

In the spray tower according to the third preferred embodiment, the pressure loss is reduced while the gas turns around the lower ends of the cylinders of the guide cylinder group.

While the present invention has been described in terms of the preferred embodiments, the invention is not to be limited thereto, but can be embodied in various ways without departing from the principle of the invention as defined in the appended claims. For example, the number of the guide cylinders, the number of the rectifying plates and the like are not limited to those shown in the figures, but may take other values. Further, two or more of the foregoing preferred embodiments may be combined with each other.

What is claimed as new and desired to be secured by Letters Patent of the United States is:

1. A spray tower having an inner tube and an outer tube arranged coaxial with each other on a common vertical axis so as to allow dusty gas to flow downward between the inner and outer tubes and then change its flow direction to flow upward within the inner tube for performing dust removal, temperature control and humidity control, said spray tower comprising:

a short concentric guide cylinder group provided at a lower end of said inner tube, said guide cylinder group having diameters smaller than a diameter of said inner tube and arranged vertically such that lower ends of said guide cylinder group form a shape of an inverted cone; and a guide vane provided under said guide cylinder group, said guide vane having a shape of an inverted truncated cone whose diameter is reduced in a downward direction.

2. The spray tower of claim 1 wherein a lower portion of said outer tube comprises a conical hopper section and wherein said guide vane extends substantially parallel to said hopper section.

* * * * *